US012657878B2

(12) United States Patent
Kimura

(10) Patent No.: US 12,657,878 B2
(45) Date of Patent: Jun. 16, 2026

(54) INFORMATION PROCESSING APPARATUS, METHOD FOR CONTROLLING THE SAME, AND NON-TRANSITORY COMPUTER-READABLE STORAGE MEDIUM

(71) Applicant: CANON KABUSHIKI KAISHA, Tokyo (JP)

(72) Inventor: Takato Kimura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 373 days.

(21) Appl. No.: 17/941,060

(22) Filed: Sep. 9, 2022

(65) Prior Publication Data

US 2023/0077498 A1     Mar. 16, 2023

(30) Foreign Application Priority Data

Sep. 15, 2021     (JP) ................................. 2021-150417

(51) Int. Cl.
*G06K 9/00*          (2022.01)
*G06T 7/10*          (2017.01)
                     (Continued)

(52) U.S. Cl.
CPC ............ *G06V 10/7715* (2022.01); *G06T 7/10* (2017.01); *G06V 10/761* (2022.01);
(Continued)

(58) Field of Classification Search
CPC ............ G06V 10/7715; G06V 10/761; G06V 10/764; G06V 10/774; G06V 10/82;
(Continued)

(56) References Cited

U.S. PATENT DOCUMENTS 7,680,748 B2 *   3/2010   Heisele ................. G06F 18/231
                                                      706/20
8,675,974 B2 *   3/2014   Iio ..................... G06F 18/23213
                                                      382/190
(Continued)

FOREIGN PATENT DOCUMENTS

CA          3002100 A1 *  10/2019   ............. G06N 3/084
JP          6884871 B2     6/2021
                (Continued)

OTHER PUBLICATIONS

Scalable Vision Transformers with Hierarchical Pooling, Zizheng Pan et al., arXiv, Aug. 2021, pp. 1-11 (Year: 2021).*
(Continued)

*Primary Examiner* — Jayesh A Patel
(74) *Attorney, Agent, or Firm* — Carter, DeLuca & Farrell LLP

(57)          ABSTRACT

This disclosure provide an apparatus which comprises an acquisition unit that acquires an image, a divider that divides the image into a plurality of partial images; a converter that converts the partial images into tokens having fixed dimensional vectors; an adder that adds a class-token having a vector of a dimension same as the two or more tokens to the tokens obtained by the converter; an encoder that updates the tokens obtained by the adder based on a relevance between the tokens to obtain final encoded representations; an acquiring unit that acquires an encoded representation corresponding to the class-token in the encoded representations obtained by the encoder as class-token encoded representations; and a combining unit that combines the class-token encoded representations to obtain a feature vector of the input image.

14 Claims, 7 Drawing Sheets

(51) Int. Cl.

| | |
|---|---|
| *G06V 10/74* | (2022.01) |
| *G06V 10/764* | (2022.01) |
| *G06V 10/77* | (2022.01) |
| *G06V 10/774* | (2022.01) |
| *G06V 10/82* | (2022.01) |
| *G06V 40/16* | (2022.01) |

(52) U.S. Cl.
CPC .......... *G06V 10/764* (2022.01); *G06V 10/774* (2022.01); *G06V 10/82* (2022.01); *G06V 40/168* (2022.01); *G06T 2207/20021* (2013.01); *G06T 2207/20081* (2013.01); *G06T 2207/20084* (2013.01); *G06T 2207/30201* (2013.01)

(58) Field of Classification Search
CPC ................... G06V 40/168; G06T 7/10; G06T 2207/20021; G06T 2207/20081; G06T 2207/20084; G06T 2207/30201
See application file for complete search history.

(56) References Cited

U.S. PATENT DOCUMENTS

| | | | | |
|---|---|---|---|---|
| 9,158,971 | B2 * | 10/2015 | Gaidon | .................. G06V 20/40 |
| 11,971,955 | B1 * | 4/2024 | Chakraborty | ....... G06F 3/04845 |
| 2011/0158535 | A1 * | 6/2011 | Iio | ..................... G06F 18/23213 |
| | | | | 382/190 |
| 2015/0248586 | A1 * | 9/2015 | Gaidon | .................. G06V 20/40 |
| | | | | 382/103 |
| 2021/0174162 | A1 | 6/2021 | Le | |
| 2021/0319243 | A1 * | 10/2021 | Jin | ....................... G06V 10/454 |
| 2022/0036564 | A1 * | 2/2022 | Ye | ............................ G06T 7/11 |
| 2022/0092366 | A1 * | 3/2022 | Chiu | ................... G06N 3/0464 |
| 2024/0221128 | A1 * | 7/2024 | Chen | ................... G06N 3/0895 |

FOREIGN PATENT DOCUMENTS

| | | | |
|---|---|---|---|
| WO | 2018217948 | A1 | 11/2018 |
| WO | 2021/095213 | A1 | 5/2021 |

OTHER PUBLICATIONS

Image Captioning: Transforming Objects into Words, Simao Herdade et al., NeurIPS, 2019, pp. 1-11 (Year: 2019).*
Image Classification for Soybean and Weeds Based on ViT, Jingxin Liang et al, 2021, pp. 1-7 (Year: 2021).*
Method for Diagnosis of Acute Lymphoblastic Leukemia Based on VIT-CNN Ensemble Model, Zhencun Jiang et al., Hindawi, Aug. 2021, pp. 1-12 (Year: 2021).*
Training Vision Transformers for Image Retrieval, Alaaeldin El-Nouby et al., arXiv, Feb. 2021, pp. 1-10 (Year: 2021).*
Face Transformer for Recognition, Yaoyao Zhong et al., arXiv, Apr. 2021, pp. 1-5 (Year: 2021).*
An Image is Worth 16×16 words:. Transformers for Image Recognition at Scale, Alexey et al., arXiv, Jun. 2021, pp. 1-22 (Year: 2021).*
CrossViT: Cross-Attention Multi-Scale Vision Transformer for Image Classification, Chun-Fu (Richard) Chen et al., arXiv, Aug. 22, 2021, pp. 1-12 (Year: 2021).*
Deng, J. et al. "ArcFace: Additive Angular Margin Loss for Deep Face Recognition" CVPR (Jun. 2019) pp. 4690-4699.
Dosovitskiy, A. et al., "An Image Is Worth 16×16 Words: Transformers for Image Recognition at Scale" ICLR 2021, arXiv: 2010.11929v2 (Jun. 2021) pp. 1-22.
Zhong, Y. et al., "Face Transformer for Recognition" arXiv:2103.14803v2 (Apr. 2021) pp. 1-5.
Chen, C-F et al., "CrossViT: Cross-Attention Multi-Scale Vision Transformer for Image Classification" arXiv:2103.14899v2 (Aug. 2021) pp. 1-12.
Notice of Reasons for Refusal issued by the Japanese Patent Office on May 23, 2025 in corresponding JP Patent Application No. 2021-150417, with English translation.

* cited by examiner

F I G. 1
100
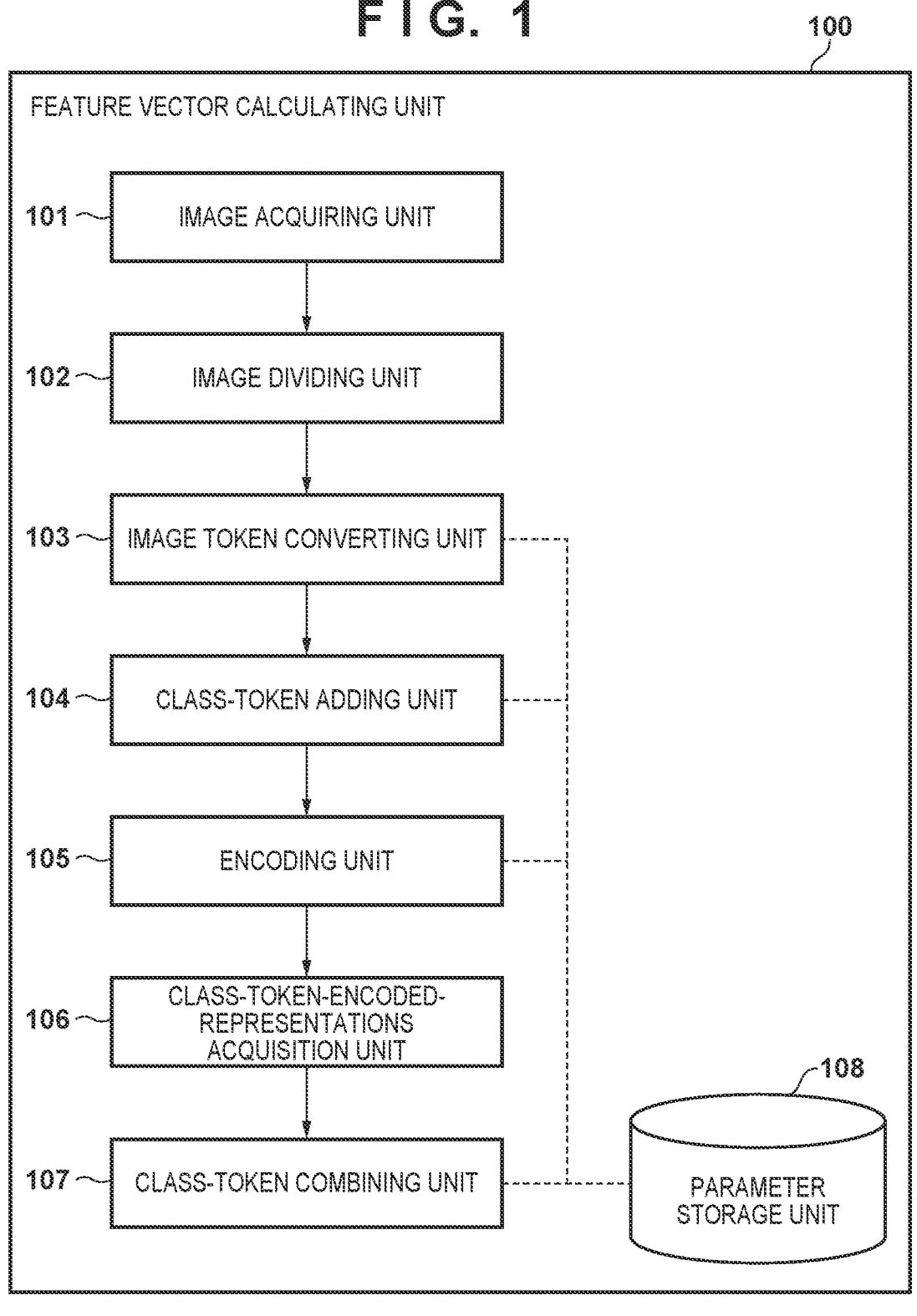

F I G.  2
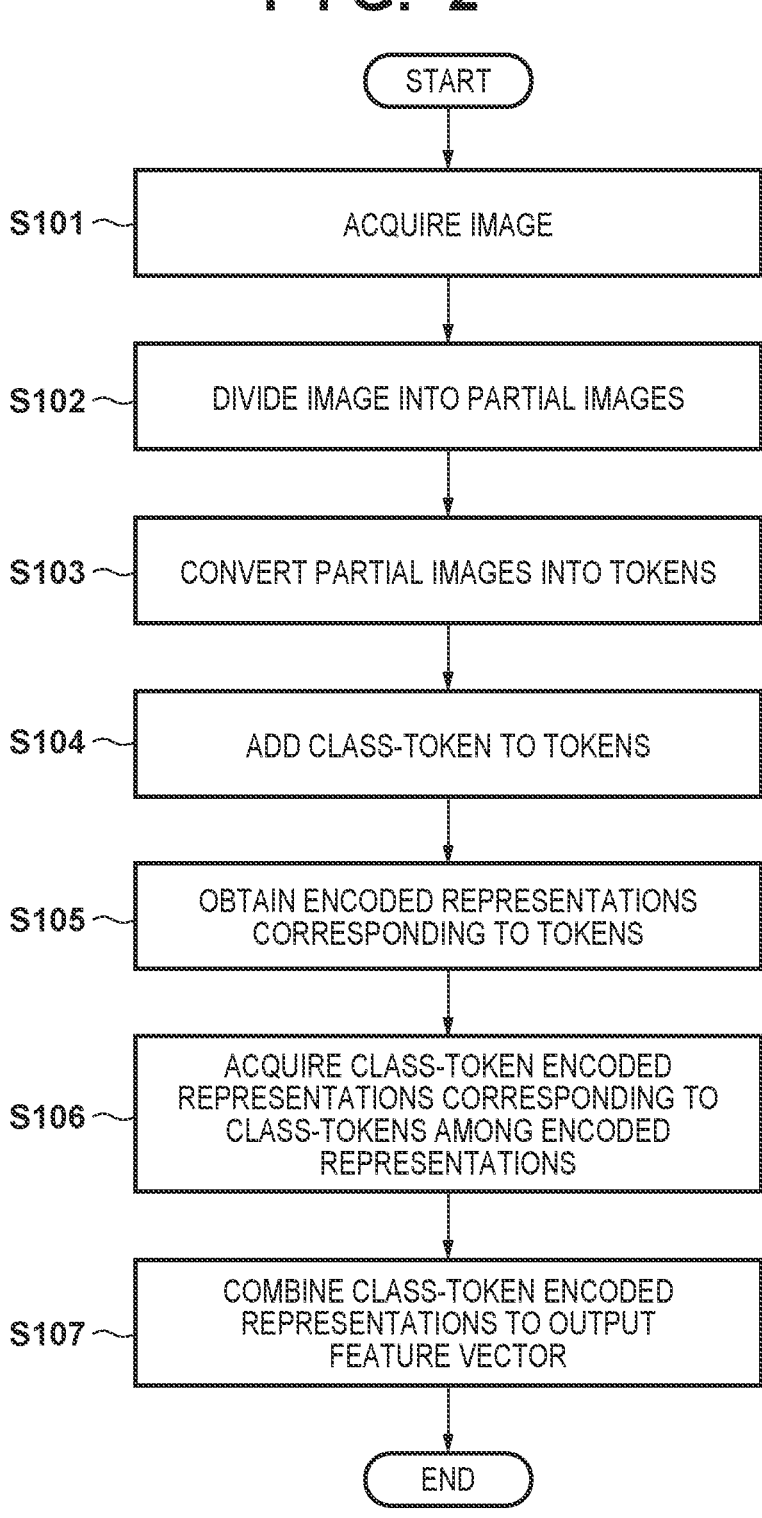

F I G. 3
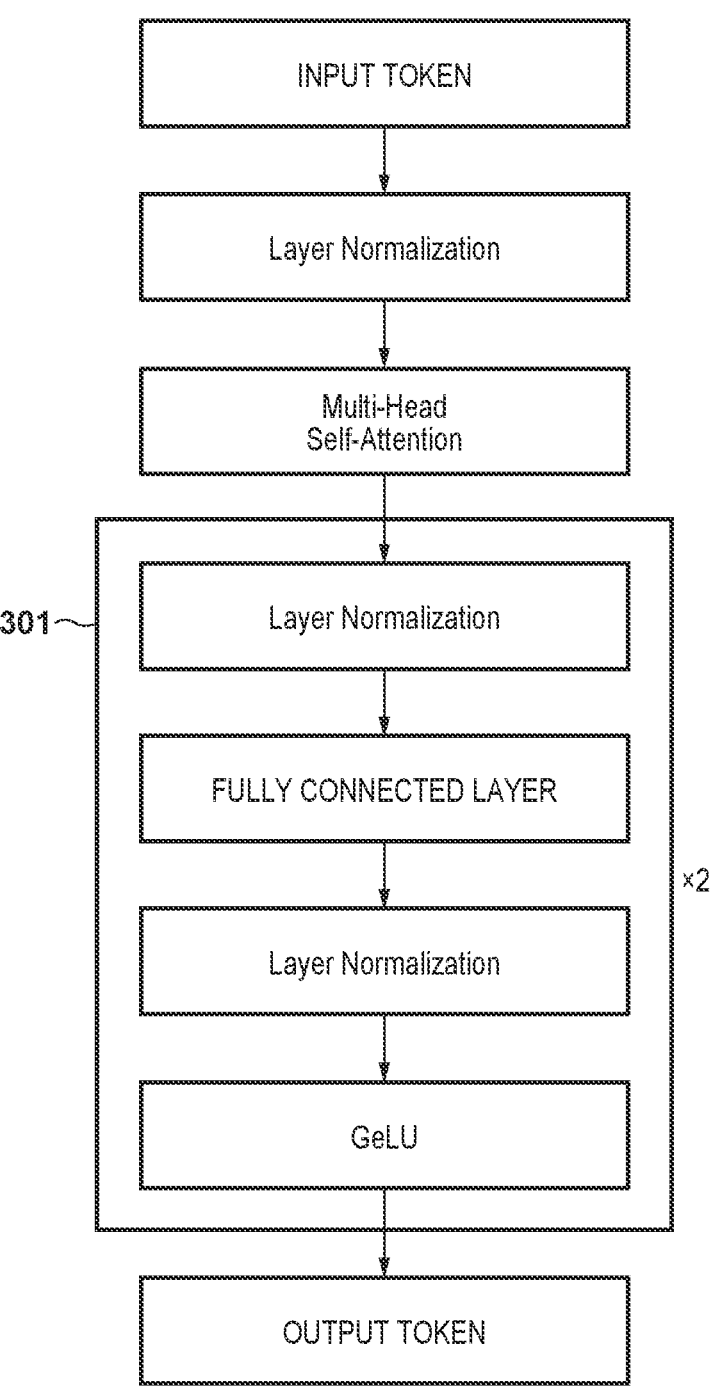

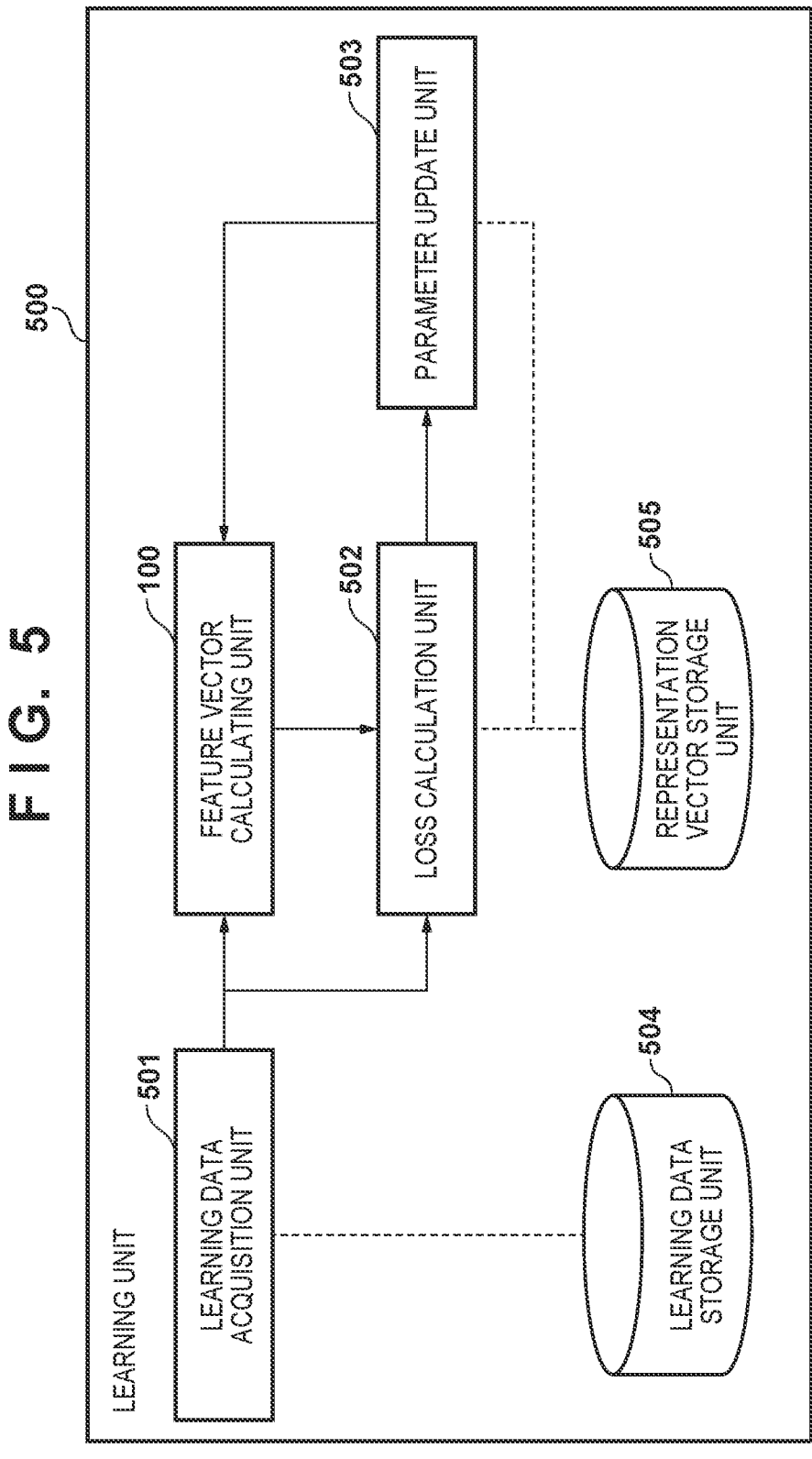
F I G. 5

F I G. 6

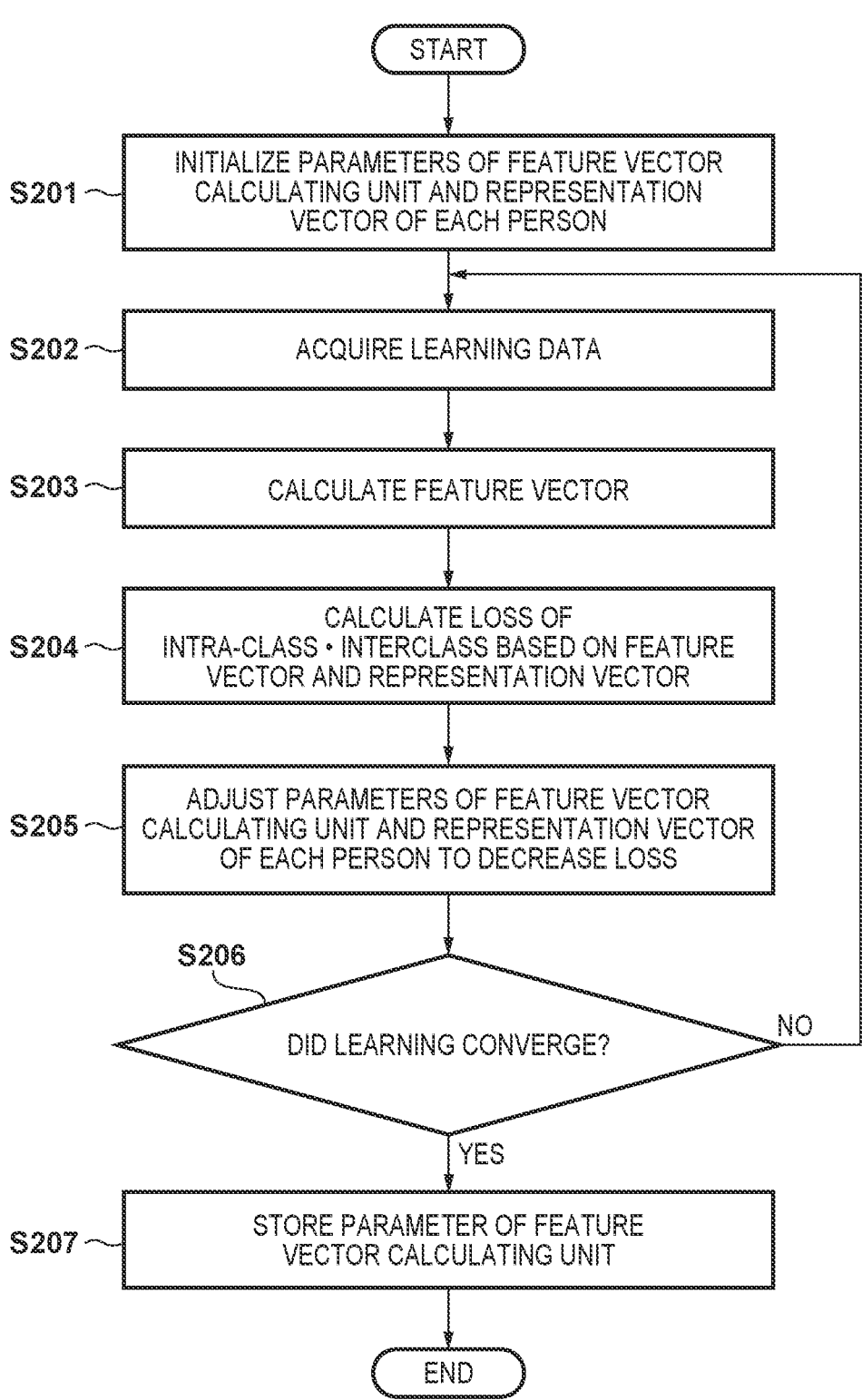

START

S201 — INITIALIZE PARAMETERS OF FEATURE VECTOR CALCULATING UNIT AND REPRESENTATION VECTOR OF EACH PERSON

S202 — ACQUIRE LEARNING DATA

S203 — CALCULATE FEATURE VECTOR

S204 — CALCULATE LOSS OF INTRA-CLASS · INTERCLASS BASED ON FEATURE VECTOR AND REPRESENTATION VECTOR

S205 — ADJUST PARAMETERS OF FEATURE VECTOR CALCULATING UNIT AND REPRESENTATION VECTOR OF EACH PERSON TO DECREASE LOSS

S206 — DID LEARNING CONVERGE?

NO

YES

S207 — STORE PARAMETER OF FEATURE VECTOR CALCULATING UNIT

END

F I G. 7
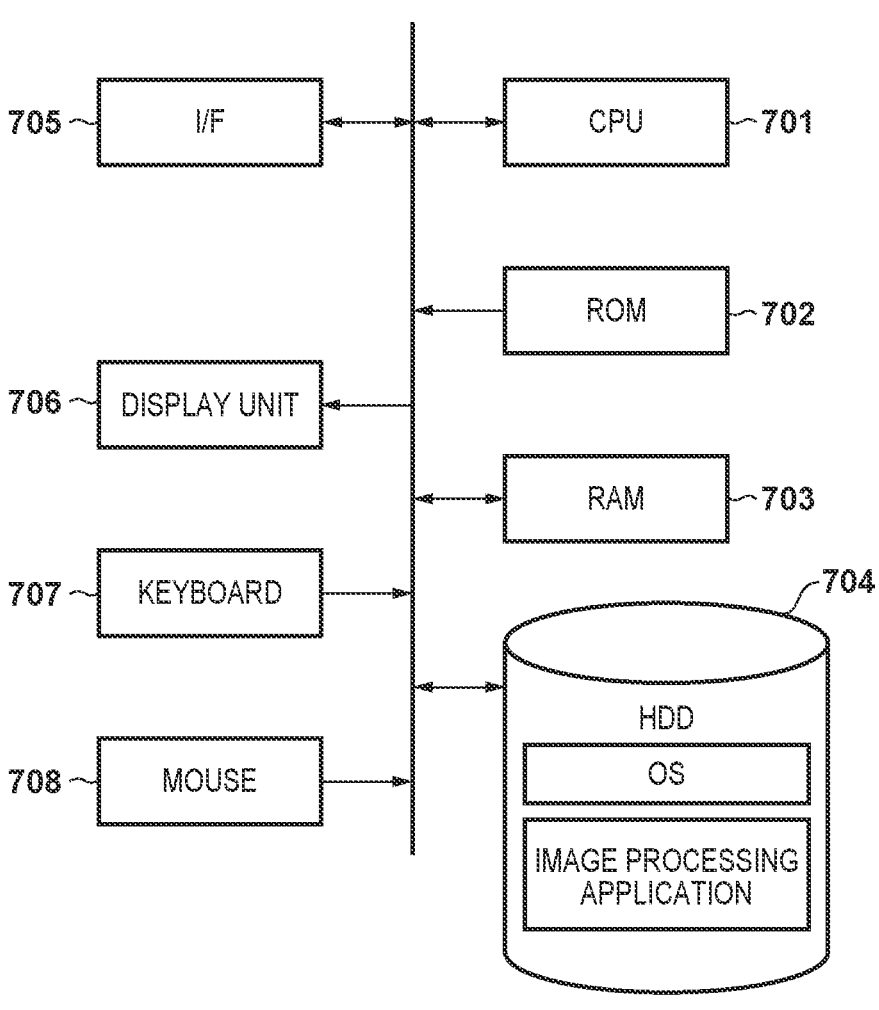

INFORMATION PROCESSING APPARATUS, METHOD FOR CONTROLLING THE SAME, AND NON-TRANSITORY COMPUTER-READABLE STORAGE MEDIUM

BACKGROUND OF THE INVENTION

Field of the Invention

The present invention relates to an information processing apparatus, a method for controlling the same, and a non-transitory computer-readable storage medium.

Description of the Related Art

Feature extractors that extract information useful for solving an intended task from an image as a feature vector have been proposed many. Among them, a feature extractor using a Convolutional Neutral Network (hereinafter CNN), which is one method of Deep Neutral Network (hereinafter DNN), exhibited high performance.

Recently, Non-Patent Document 1 proposes Vision Transformer (hereinafter ViT) in which a DNN referred to as Transformer (Patent Document 1) widely used in a natural language processing field is applied to image recognition. The feature extractor using ViT exhibits performance superior to the feature extractor using CNN in an image classification task. Further, by applying the feature extractor using ViT to a face recognition task, Non-Patent Document 2 exhibits performance equivalent to that of the feature extractor using CNN.

The ViT repeats a process of extracting features from respective partial areas in an image by a plurality of mechanisms referred to as Self-Attentions and a process of paying attention to a part of the partial areas and aggregating the features obtained from them to one vector referred to as a class-token, so as to calculate a feature vector.

LIST OF REFERENCES

[Patent Document 1] Japanese Patent No. 6884871

[Non-Patent Document 1] Dosovitskiy, Alexey, et al. An Image Is Worth 16×16 Words: Transformers for Image Recognition at Scale. ICLR 2021: The Ninth International Conference on Learning Representations, 2021.

[Non-Patent Document 2] Zhong. Y., & Deng, W. (2021). Face Transformer for Recognition. arXiv preprint arXiv: 2103.14803.

[Non-Patent Document 3] Deng. et. Al. ArcFace: Additive Angular Margin Loss for Deep Face Recognition. In CVPR, 2019

When each Self-Attention in the ViT aggregates the information to the class-token, it is ideal that the ViT performs learning so as to pay attention to the partial areas different from one another. This is because since information of the entire image can be extracted, the ViT is robust against position change and hide of an object in the image and redundancy between the Self-Attentions is low, and thus parameters of the ViT can be effectively unitized.

However, the learning is not always performed in the ideal state described above, and there may be a case where the respective Self-Attentions learn so as to pay attention to the mutually same partial areas. This decreases robustness against the position change and the hide of the object in the image and cannot effectively unitize the parameters of ViT, thereby deteriorating the performance.

SUMMARY OF THE INVENTION

The present invention provides a technique that solves the problem described above and improves performance of a feature extractor using ViT.

According to an aspect of the invention, there is provided an image processing apparatus, comprising: an image acquisition unit that acquires an input image; a dividing unit that divides the input image into a plurality of partial images: a token conversion unit that converts the partial images into tokens having fixed dimensional vectors to convert partial images divided by the dividing unit into tokens; an adding unit that adds a class-token having a vector of a dimension same as the two or more tokens to the tokens obtained by the token conversion unit: an encoding unit that updates the tokens obtained by the adding unit based on a relevance between the tokens to obtain final encoded representations; a class-token-encoded-representations acquiring unit that acquires an encoded representation corresponding to the class-token in the encoded representations obtained by the encoding unit as class-token encoded representations; and a combining unit that combines the class-token encoded representations to obtain a feature vector of the input image.

According to the present invention, the performance of the feature extractor using the VIT can be further improved.

Further features of the present invention will become apparent from the following description of exemplary embodiments with reference to the attached drawings.

BRIEF DESCRIPTION OF THE DRAWINGS

FIG. 1 is a block diagram illustrating a functional configuration example of a feature vector calculating unit according to a first embodiment.

FIG. 2 is a flowchart depicting a procedure of feature vector calculating processing according to the first embodiment.

FIG. 3 is a schematic view of a Transformer Encoder according to the first embodiment.

FIG. 5 is a block diagram illustrating a functional configuration example of a learning unit according to the first embodiment.

FIG. 6 is a flowchart depicting a procedure of a learning process according to the first embodiment.

FIG. 7 is a hardware configuration drawing of an information processing apparatus according to the first embodiment.

DESCRIPTION OF THE EMBODIMENTS

Figure 4:
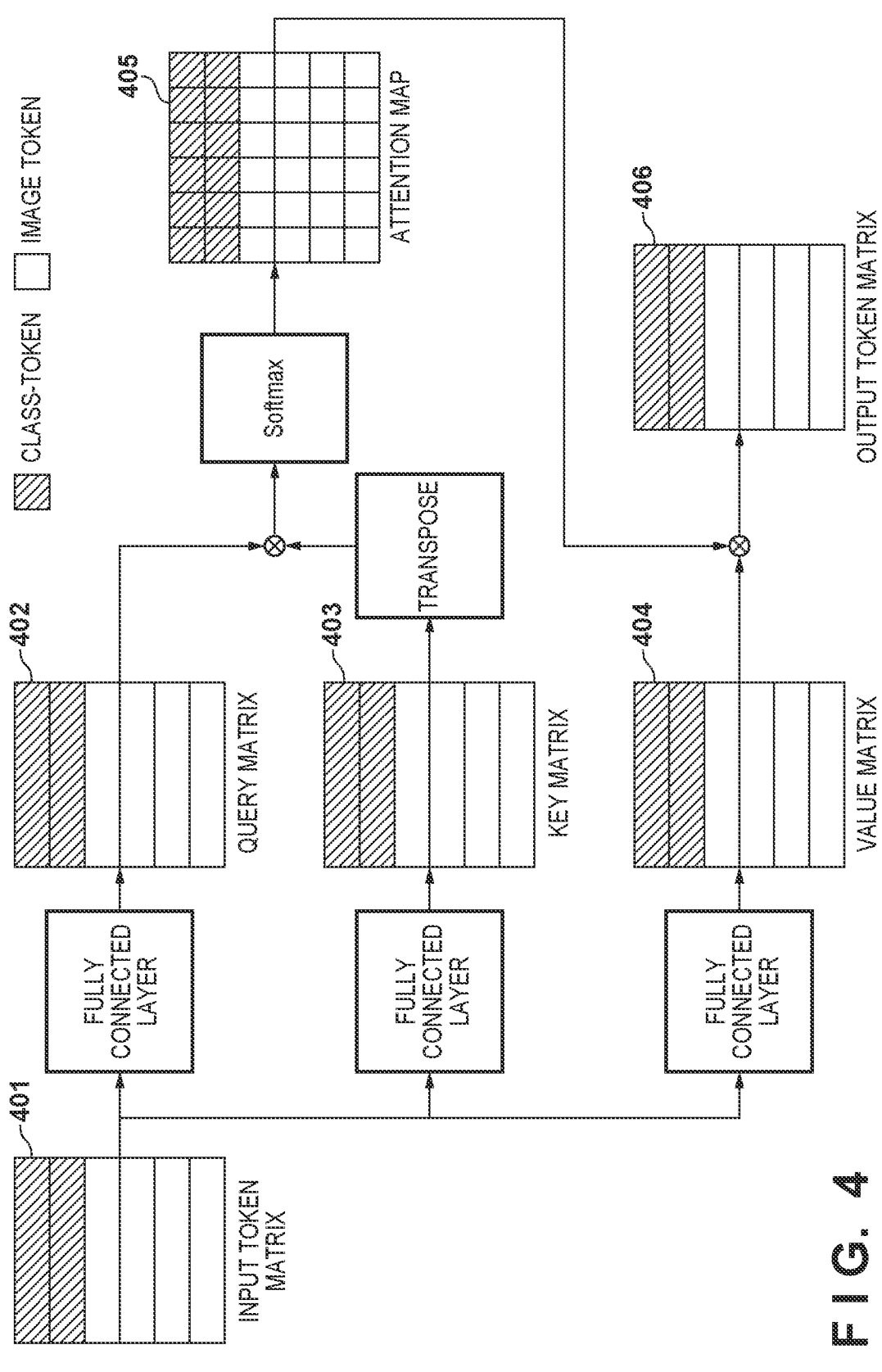
FIG. 4 is a schematic view of Self-Attention according to the first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

The following will give a description with an example of a task that calculates a feature vector for identifying an identity of a face from an image (hereinafter, a face image) of a face of one person.

First Embodiment

FIG. 7 is a hardware configuration drawing of an information processing apparatus represented by a personal computer applied in the embodiment. In the following, the similar configuration and operation will be described.

When a power source of the apparatus turns ON, a CPU 701 executes a boot program stored in a ROM 702, performs a hardware initialization process, loads an (Operating System) OS stored in an HDD (hard disk) 704 on a RAM, and moves (performs) control to the OS. Thus, the apparatus functions as the information processing apparatus. That is, a display unit 706, a keyboard 707, and a mouse 708 function as interfaces with a user. An I/F 705 is an interface for communications with an external device, and is typically, for example, a network interface and a Universal Serial Bus (USB). Input image data to be processed in the present embodiment is also input via this I/F 705. In the configuration described above, when the user operates the keyboard 707 or the mouse 708 to perform predetermined instruction inputting. the CPU 701 loads an image processing application program from the HDD 704 into a RAM 703, and executes the image processing application program. Thus, the apparatus functions as the image processing apparatus. Hereinafter, a case where the apparatus functions as the image processing apparatus will be described.

In the first embodiment, a process of calculating a feature vector from the face image and a learning process in an image processing application will be described.

FIG. 1 is a block diagram illustrating a functional configuration example of a feature vector calculating unit according to the present embodiment. An illustrated parameter storage unit 108 corresponds to the HDD 704 in FIG. 7, and it should be understood that reference numerals 101 to 107 other than that function by performing the image processing application by the CPU 701. Obviously, a circuit dedicated for it may be configured by hardware, not the program executed by the CPU 701.

A feature vector calculating unit 100 includes an image acquiring unit 101, an image dividing unit 102, an image token converting unit 103, a class-token adding unit 104, an encoding unit 105, a class-token-encoded-representations acquisition unit 106, a class-token combining unit 107, and the parameter storage unit 108.

A supply source of the image acquired by the image acquiring unit 101 may be, for example, an image capturing device or a storage medium that stores a captured image, and any type may be used.

FIG. 2 is a flowchart depicting a flow of the process of calculating the feature vector from the face image performed by the feature vector calculating unit 100 in the present embodiment. Hereinafter, the procedure for calculating the feature vector from the face image will be described with reference to FIG. 1 and FIG. 2.

First, at Step S101, the image acquiring unit 101 acquires the face image. Here, a unit of the face image is a pixel, and a width of the pixel is indicated by W and a height of the pixel is indicated by H (that is, W×H pixels).

At Step S102, the image dividing unit 102 divides the acquired face image into partial images, which are a set of preset partial images having predetermined sizes. A width indicating the size of the partial image is indicated by $P_W$ and a height thereof is indicated by $P_H$. When the number of partial images is indicated by N, $N=W\times H/(P_W\times P_H)$. Note that the partial images may partially overlap on the face image.

At Step S103, the image token converting unit 103 performs conversion of the partial image into an image token as a D-dimensional vector on all of the partial images. In other words, the image token converting unit 103 converts the partial images into tokens. The conversion into the image token first planarizes the partial image to convert it into a $P_W P_H$-dimensional vector and then convert it into the D-dimensional vector by DNN. The DNN is constituted by, for example, a fully connected layer. The DNN only needs to have a configuration of converting the $P_W P_H$-dimensional vector into the D-dimensional vector, and the present embodiment does not limit the configuration. The DNN is learned by a learning process described later.

At Step S104, the class-token adding unit 104 adds class-tokens, which are two or more D-dimensional vectors, to the tokens. The class-tokens are learnable parameters and are learned by the learning process described later. Here, as in Non-Patent Document 1, a Positional Embedding vector as a D-dimensional vector may be added to each token included in the tokens. The Positional Embedding vector has an effect of holding position information of the partial image corresponding to each token on the face image.

At Step S105, the encoding unit 105 performs a process of updating each token by one or more times based on association between the tokens included in the tokens by DNN to obtain encoded representations. The DNN has a multi-stage Transformer Encoder block known by Non-Patent Document 1. FIG. 3 illustrates a schematic diagram of the Transformer Encoder block. The Transformer Encoder block is constituted by Layer Normalization as a normalized layer, Multi-Head Self-Attention (hereinafter MHSA) known by Non-Patent Document 1, a fully connected layer, and Gaussian Error Linear Units (hereinafter GeLUs), which are non-linear activation functions. An MLP block 301 in FIG. 3 is repeated twice. The configuration described here is an example, and Batch Normalization may be used as a normalized layer instead of the Layer Normalization. A Rectified Linear Unit may be used as a non-linear activation function instead of the GeLU. The number of repetitions of the MLP block 301 is arbitrarily. A convolutional layer may be further added. The present embodiment does not limit them. The DNN is learned by the learning process described later.

Here, the MHSA will be described. Since the MHSA is a derivative form of the mechanism, Self-Attention, first, the Self-Attention will be described with reference to the schematic diagram in FIG. 4. For simplicity, it is assumed that the number of image tokens is 4 and the number of class-tokens is 2. An input token matrix 401 is an expression of the tokens by matrix, and a row vector is a token. First, application of three fully connected layers to the input token matrix 401 converts the input token matrix 401 into a query matrix 402, a key matrix 403, and a value matrix 404. Next, a matrix product of the query matrix 402 and a matrix in which the key matrix 403 is transposed is calculated, each element in the obtained matrix is divided by VD, and the resultant is multiplied by a Softmax function in column-wise direction to calculate an attention map 405. The attention map 405 is a matrix of the number of tokens x the number of tokens (here, 6×6) having relationships between the respective tokens as elements and is normalized such that the element sum of respective row vectors becomes 1. Each row vector in the attention map 405 expresses a ratio of what extent should each token be paid attention to obtain an encoded representation for a certain token. For image tokens, the token having a large number of pieces of information required to characterize the partial image corresponding to the token attracts high attention. For class-tokens, the token having information required to identify a person in the face image attracts high attention. Finally, a matrix product of the value matrix 404 and the attention map 405 is performed to calculate an output token matrix. The configuration described here is an example, and, for example, a fully connected layer may be further applied to the attention map 405, and the present embodiment does not limit the configuration. The MHSA is a method that divides the input token matrix 401 into H pieces in the column-wise direction (the dimension of the token is D/H), applies Self-Attention to each of the divided input token matrixes, and then couples them in the column-wise direction to combine them. This brings an effect of preventing a tendency of ignoring a small feature in each dimension in a high-dimensional vector by division into low-dimensional vectors. The MHSA calculates H pieces of the attention maps.

At Step S106, the class-token-encoded-representations acquisition unit 106 acquires encoded representations corresponding to the class-tokens as class-token encoded representations among the encoded representations obtained by the encoding unit.

At Step S107, a class-token combining unit 107 combines the class-token encoded representations by the DNN to output a final feature vector. The DNN is constituted by one fully connected layer. The use of DNN is merely an example, and a method other than the DNN like basic statistic, such as weighted sum, an average of vectors, and a total sum, may be used. A plurality of fully connected layers may also be used for the configuration of DNN. Additionally, the class-token combining unit 107 may also be configured by Transform Encoder. Specifically, the class-token combining unit 107 includes a feature vector token adding unit that adds a feature vector token as one D-dimensional vector to the class-token encoded representations, a second encoding unit that obtains second encoded representations from the class-token encoded representations obtained by the feature vector token adding unit, and a feature vector acquisition unit that acquires a feature vector encoded representation corresponding to the feature vector token as a feature vector in the second encoded representations obtained by the second encoding unit. The method only needs to be a method that combines the class encoded representations formed of a plurality of class encoded representations and outputs a single feature vector, and the present embodiment does not limit the method. The DNN is learned by a learning process described later.

Here, a method for determining whether respective persons are the same person or different persons based on the feature vector calculated by the feature vector calculating unit 100 when two face images are provided will be described.

First, the processes from Step S101 to Step S107 described above are performed on each of the two images. This calculates the feature vectors of the first image and the second image. The feature vectors are expressed as $f_1$ and $f_2$, respectively.

Next, a degree of similarity score for the two feature vectors is calculated. There are a plurality of the known examples for a degree of similarity used for the degree of similarity score between the feature vectors, and here, same as the method in Non-Patent Document 3, an angle between feature value vectors is used. A degree of similarity score S is calculated by Equation (1) below.

$$S(f_1, f_2) := \cos \theta_{12} = \frac{\langle f_1, f_2 \rangle}{\|f_1\|\|f_2\|} \tag{1}$$

Here, $\theta_{12}$ indicates an angle formed by the feature vectors $f_1$ and $f_2$, $\langle x, y \rangle$ indicates an inner product of the vectors x, y, and $\|x\|$ indicates a Euclid norm of the vector x.

Finally, when the degree of similarity score S described above is equal to or less than a predetermined threshold, it is determined that the persons are the same person. When not, it is determined that the persons are different persons.

FIG. 5 is a block diagram illustrating a basic functional configuration of a learning unit according to the present embodiment. A learning unit 500 includes a learning data acquisition unit 501, the feature vector calculating unit 100, a loss calculation unit 502, a parameter update unit 503, a learning data storage unit 504, and a representation vector storage unit 505.

Hereinafter, functions and operations of the respective functional configuration units of the learning unit 500 will be described. The learning data acquisition unit 501 acquires a face image set held by the learning data storage unit 504. Information on an ID of a person is given to each image (for example, a person ID is a file name). The feature vector calculating unit 100 calculates the feature vector from the face image set obtained by the learning data acquisition unit 501. The loss calculation unit 502 calculates a loss value from the face image set obtained by the learning data acquisition unit 501, the feature vector obtained by the feature vector calculating unit 100, and the representation vector held by the representation vector storage unit. The parameter update unit 503 updates the parameters held by a parameter storage unit 109 in the feature vector calculating unit 100 and the representation vector held by the representation vector storage unit 505 based on the loss value obtained by the loss calculation unit 502.

FIG. 6 is a diagram depicting a flow of the learning process according to the present embodiment. Hereinafter, the procedure of the learning process will be described with reference to FIG. 1, FIG. 5, and FIG. 6. Here, learning by <representation vector method> that has been known by Non-Patent Document 3 is performed. The representation vector method is a learning method of face recognition that sets a feature value vector representative of each person and improves learning efficiency by the use of the feature value vector in combination. For details, see Non-Patent Document 3.

First, At Step S201, the feature vector calculating unit 100 initializes the parameters of the image token converting unit 103, the class-token adding unit 104, the encoding unit 105, and the class-token combining unit 107 based on the information held by the parameter storage unit 109. The plurality of class-tokens held by the class-token adding unit 104 are initialized with random numbers having values different from one another. Thus, a learning is performed such that information different from one another is aggregated to each class-token. To further enhance this effect, initialization may be performed such that the class-tokens are orthogonal to one another. At Step S201, representation vectors $v_1$ to $v_n$ held by the representation vector storage unit 505 are further initialized with random numbers. Here, 1 to n are IDs of all persons included in a learning image. The respective representation vectors v are d-dimensional vectors (d is a predetermined value).

Next, At Step S202, the learning data acquisition unit 501 randomly acquires face image sets $I_1$ to $I_m$ from the learning data storage unit 504. Information on an ID of a person is given to each image.

Next, at Step S203, the feature vector calculating unit 100 calculates a feature vector $f_i$ from each image $I_i$ (i=1, . . . , m) in the face image set. Here, the feature vector $f_i$ is a d-dimensional vector.

Next, at Step S204, the loss calculation unit 502 calculates a degree of similarity of feature values between each of the person images and the representation vector (intra-class similarity degree) $S_{Intra}$ in accordance with Equation (2a), and a degree of similarity of feature values between the representation vectors of each person and another person (interclass similarity degree $S_{Inter}$) in accordance with Equation (2b).

$$S_{Intra}(f_i)=S(f_i,V_y(i)) \ldots \tag{2a}$$

$$S_{Inter}(f_i)=\Sigma_{j\neq y(i)}S(f_i,v_j) \ldots \tag{2b}$$

Here, y(i) is the ID number of the person in the image $I_i$. The sum of each image as shown in the following Equation (3) is a loss value L used for learning.

$$L=\Sigma_i(S_{Inter}(f_i)-\lambda S_{Intra}(f_i)) \ldots \tag{3}$$

Here, $\lambda$ is a weight parameter (weight coefficient) for balance of learning. Note that the loss value described above is an example, there are the various known methods using a loss function, such as use of a degree of similarity score with margin and cross entropy. Since the details thereof are not significant in the disclosure of the present invention, the present embodiment describes a configuration example of a relatively simple loss value as described above. For details, see, for example, Non-Patent Document 3.

Next, at Step S205, the parameter update unit 503 updates the respective parameters of the image token converting unit 103, the class-token adding unit 104, the encoding unit 105, and the class-token combining unit 107 held by the parameter storage unit 109 and the value of the representation vector held by the representation vector storage unit 505. By the use of typical back propagation method in DNN, the loss value is infinitesimally updated to decrease. As a result, the representation vector is improved to further function as a value representing the feature of each person, and the feature vectors output by the feature vector calculating unit 100 are improved so as to be similar to one another as long as they are the feature vectors of the same person.

The learning unit 500 determines that the learning has converged the learning process as described above, and when determines that the learning does not converge, the processes at and after S201 described above are repeated. Note that, instead of setting the convergence as the condition, the learning process may be performed until the learning process is performed by the preset number of times.

Next, at Step S207, the parameter storage unit 109 in the feature vector calculating unit 100 stores the held parameters and saves them.

Effects of First Embodiment

In the first embodiment, the learning is performed such that the VIT aggregates information different from one another to each class-token (a method for further enhancing the effect will be described in a second embodiment). To aggregate the information different from one another to each class-token, respective Self-Attentions need to pay attention to the image tokens different from one another. Therefore, consequently, the learning is performed such that the respective plurality of Self-Attentions provided with the ViT pay attention to partial areas different from one another in the image. Since this allows extracting the information of the entire image, the VIT is robust against the position change and the hide of the object in the image and redundancy between the Self-Attentions is reduced, and thus the parameters of ViT can be effectively utilized. In addition, processing that combines the class-tokens having information different from one another and outputs it as the feature vector works equivalent to ensemble of feature vectors of different feature extractor and therefore brings an effect of improving performance.

Second Embodiment

In the first embodiment described above, at Step S201, by initializing the class-tokens with random number having values different from one another, the effect that the learning is performed so as to aggregate the information different from one another to each of the class-tokens is enhanced. In the second embodiment, the above-described effect is further enhanced by applying regularization such that similarity between the class-tokens becomes low at Step S204 in the first embodiment. The functional configuration example of the second embodiment is FIG. 1 and FIG. 5, similarly to the first embodiment.

A method for calculating a regularization term used for the regularization will be described. Here, the description will be given with an example of the regularization terms using three of a degree of similarity between the class-tokens, a degree of similarity between the class-token encoded representations, and a degree of similarity between the attention maps corresponding to the class-tokens. Here, although cosine similarity is used as the degree of similarity, for example, another known degree of similarity, such as Pearson's correlation coefficient, may be used. The present embodiment does not limit the degree of similarity.

The i-th class-token is denoted as $x^i$CLS, the class-token encoded representation corresponding to the i-th class-token output by the first Transformer Encoder is denoted as $z^{li}$CLS, and the row vector corresponding to the i-th class-token in the attention map calculated by the h-th Self-Attention of the MHSA included in the first Transformer Encoder is denoted as $a^{lhi}$CLS. <x, y>indicates an inner product of the vectors x, y, and |x| indicates a Euclid norm of the vector x.

A regularization term $R_1$ using the degree of similarity between the class-tokens is calculated by the next Equation (4).

$$R_1 = -\sum_i\sum_j \frac{\langle x^i_{CI,S}, x^j_{CLS}\rangle}{\|x^i_{CLS}\|\|x^j_{CLS}\|} \tag{4}$$

A regularization term $R_2$ using the degree of similarity between the class-token encoded representations is calculated by the next Equation (5).

$$R_2 = -\sum_l\sum_i\sum_j \frac{\langle z^{li}_{CLS}, z^{lj}_{CLS}\rangle}{\|z^{li}_{CLS}\|\|z^{lj}_{CLS}\|} \tag{5}$$

9 10

The degrees of similarity of the class-token encoded representations of a part of the Transformer Encoders may be used, and a weighted sum of the degrees of similarity of the class-token encoded representations of the respective Transform Encoders may be used. The present embodiment does not limit them. A regularization item $R_3$ using the degree of similarity between the attention maps corresponding to the class-tokens is calculated by the next Equation (6).

$$R_3 = -\sum_i \sum_h \sum_i \sum_j \frac{\langle a_{CLS}^{lhi}, a_{CLS}^{lhj} \rangle}{\|a_{CLS}^{lhi}\| \|a_{CLS}^{lhj}\|} \quad (6)$$

The degrees of similarity of the attention maps of a part of the Transformer Encoders may be used, and a weighted sum of the degrees of similarity of the attention maps of the respective Transform Encoders may be used. The degrees of similarity of the attention maps of a part of the MHSAs may be used, and a weighted sum of the degrees of similarity of the respective attention maps of the MHSAs may be used. The present embodiment does not limit them.

The loss value L found by adding the above-described regularization terms to Equation 3 is used for learning. The loss value L is calculated by a loss function shown in the next Equation (7).

$$L = \Sigma_i (S_{Inter}(f_i) - \lambda S_{Intra}(f_i)) + \mu_1 R_1 + \mu_2 R_2 + \mu_3 R_3 \ldots \quad (7)$$

Here, $\mu_1$, $\mu_2$, $\mu_3$ are weight parameters for balance of learning. In the equation described above, all of the regularization terms $R_1$, $R_2$, $R_3$ are used, but it is only necessary to use at least one of them.

Effects of Second Embodiment

With the second embodiment, since the learning is performed so as to decrease the value of the regularization terms, the degree of similarity between the class-tokens, the degree of similarity between the class-token encoded representations, and the degree of similarity between the attention maps corresponding to the class-tokens also decrease. In this way, the ViT learns so as to aggregate different information depending on each of the class-tokens, and the effects of the first embodiment can be further enhanced.

As described above, according to the first and second embodiments of the present invention, the feature extractor using ViT combines the information different from one another to the plurality of class-tokens, aggregates them, and output it as the feature vector. In this way, the respective plurality of Self-Attentions provided with the ViT pay attention to the partial areas different from one another in the image. Additionally, the process of combining the class-tokens having the information different from one another and outputting it as the feature vector works similarly to ensemble of the feature vectors of the different feature extractors. As a result, the effect of improvement in performance is provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-150417, filed Sep. 15, 2021, which is hereby incorporated by reference herein in its entirety.

What is claimed is:

1. An image processing apparatus, comprising:
a processor; and
a memory including instructions, which when executed by the processor, cause the image processing apparatus to perform operations comprising:
    acquiring an input image;
    dividing the input image into a plurality of partial images;
    converting the partial images into tokens having fixed dimensional vectors;
    adding two or more class tokens having a vector of a dimension same as the tokens having fixed dimensional vectors to the tokens having fixed dimensional vectors;
    updating the two or more class tokens based on a relevance between the two or more class tokens to obtain encoded representations;
    acquiring class-token encoded representations corresponding to each of the two or more class tokens in the encoded representations; and
    combining the two or more class encoded representations to obtain a feature vector of the input image, wherein
a learning is performed with a loss function including a regularization term that decreases at least one of a degree of similarity between the two or more class tokens and a degree of similarity between the class-token encoded representations.

2. The apparatus according to claim 1, wherein combining the class-token encoded representations includes outputting a weighted sum of the class-token encoded representations as the feature vector of the input image.

3. The apparatus according to claim 1, wherein combining the class-token encoded representations includes outputting a basic statistic of the class-token encoded representations as the feature vector of the input image.

4. The apparatus according to claim 1, wherein combining the class-token encoded representations includes combining the class-token encoded representations by neural network to obtain the feature vector of the input image.

5. The apparatus according to claim 1, wherein combining the class-token encoded representations includes:

adding one feature vector token to the class-token encoded representations;

obtaining second encoded representations from the class-token encoded representations; and acquiring a feature vector encoded representation corresponding to a feature vector token in the second encoded representations as the feature vector of the input image.

6. The apparatus according to claim 1, wherein updating the tokens includes calculating an attention map including a matrix of the number of tokens x the number of tokens having relationships between the respective tokens as elements, and a learning is performed with a loss function including a regularization term, and the regularization term decreases at least one of a degree of similarity between the two or more class tokens, a degree of similarity between the class-token encoded representations, and a degree of similarity between the attention maps corresponding to the two or more class tokens.

7. The apparatus according to claim 1, wherein the respective two or more class tokens are learned with common supervisory data.

8. The apparatus according to claim 1, wherein the respective two or more class tokens are initialized with random values having values different from one another for learning.

9. The apparatus according to claim 8, wherein the respective two or more class tokens are initialized so as to be orthogonal to one another for learning.

10. A method of controlling an image processing apparatus, comprising the steps of:

(a) acquiring an input image;

(b) dividing the input image into a plurality of partial images;

(c) converting the partial images into tokens having fixed dimensional vectors to convert partial images divided in the dividing (b) into tokens;

(d) adding two or more class tokens class tokens having a vector of a dimension same as the tokens to the tokens obtained in the converting (c);

(e) updating the tokens two or more class tokens obtained in the adding (d) based on a relevance between the tokens two or more class tokens to obtain encoded representations;

(f) acquiring class tokens class tokens encoded representations corresponding to each of the respective class-tokens in the encoded representations obtained in the updating (e) as class-token encoded representations; and (g) combining the class-token encoded representations to obtain a feature vector of the input image, wherein a learning is performed with a loss function including a regularization term that decreases at least one of a degree of similarity between the two or more class tokens and a degree of similarity between the class-token encoded representations.

11. A non-transitory computer-readable storage medium storing a program which, when read and executed by a computer, causes the computer to perform steps of a method controlling an image processing apparatus, the method comprising the steps of:

(a) acquiring an input image;

(b) dividing the input image into a plurality of partial images;

(c) converting the partial images into tokens having fixed dimensional vectors to convert partial images divided in the dividing (b) into tokens having fixed dimensional vectors;

(d) adding two or more class tokens having a vector of a dimension same as the tokens to the tokens obtained in the converting (c);

(e) updating the two or more class tokens obtained in the adding (d) based on a relevance between the two or more class tokens to obtain encoded representations;

(f) acquiring class-token encoded representations corresponding to each of the respective class tokens in the encoded representations obtained in the updating (e) as class-token encoded representations; and (g) combining the class-token encoded representations to obtain a feature vector of the input image, wherein a learning is performed with a loss function including a regularization term that decreases at least one of a degree of similarity between the two or more class tokens and a degree of similarity between the class-token encoded representations.

12. An image processing apparatus, comprising:

a processor; and a memory including instructions, which when executed by the processor, cause the image processing apparatus to perform operations comprising:

acquiring an input image;

dividing the input image into a plurality of partial images;

converting the partial images into tokens having fixed dimensional vectors;

adding two or more class tokens having a vector of a dimension same as the tokens having fixed dimensional vectors to the tokens having fixed dimensional vectors;

updating the tokens based on a relevance between the tokens to obtain encoded representations;

acquiring class-token encoded representations corresponding to each of the respective two or more class tokens in the encoded representations; and combining the class-token encoded representations to obtain a feature vector of the input image, wherein combining the class-token encoded representations includes:

adding one feature vector token to the class-token encoded representations;

obtaining second encoded representations from the class-token encoded representations; and acquiring a feature vector encoded representation corresponding to a feature vector token in the second encoded representations as the feature vector of the input image.

13. An image processing apparatus, comprising:

a processor; and a memory including instructions, which when executed by the processor, cause the image processing apparatus to perform operations comprising:

acquiring an input image;

dividing the input image into a plurality of partial images;

converting the partial images into tokens having fixed dimensional vectors;

adding two or more class tokens having a vector of a dimension same as the tokens having fixed dimensional vectors to the tokens having fixed dimensional vectors;

updating the tokens based on a relevance between the tokens to obtain encoded representations;

acquiring class-token encoded representations corresponding to each of the respective two or more class tokens in the encoded representations; and combining the class-token encoded representations to obtain a feature vector of the input image, wherein updating the tokens includes calculating an attention map including a matrix of the number of tokens x the number of tokens having relationships between the respective tokens as elements, and a learning is performed with a loss function including a regularization term, and the regularization term decreases at least one of a degree of similarity between the two or more class tokens, a degree of similarity between the class-token encoded representations, and a degree of similarity between the attention maps corresponding to the class tokens.

14. An image processing apparatus, comprising:

a processor; and a memory including instructions, which when executed by the processor, cause the image processing apparatus to perform operations comprising:

acquiring an input image;

dividing the input image into a plurality of partial images;

converting the partial images into tokens having fixed dimensional vectors;

adding two or more class tokens having a vector of a dimension same as the tokens to the tokens;

updating the tokens based on a relevance between the tokens to obtain encoded representations;

acquiring class-token encoded representations corresponding to each of the respective two or more class tokens in the encoded representations; and combining the class-token encoded representations to obtain a feature vector of the input image, wherein the respective two or more class tokens are initialized with random values having values different from one another, and so as to be orthogonal to one another for learning.

\* \* \* \* \*